United States Patent [19]

Miyahara

[11] Patent Number: 4,904,081
[45] Date of Patent: Feb. 27, 1990

[54] SURVEYING APPARATUS

[76] Inventor: Kenji Miyahara, 16-3 Soya 8-chome, Ichikawa-shi, Chiba-ken, Japan

[21] Appl. No.: 125,460

[22] Filed: Nov. 24, 1987

[51] Int. Cl.[4] ................... G01B 11/26; G01C 15/10; F16C 11/06
[52] U.S. Cl. .................. 356/152; 356/138; 356/400; 33/281; 33/286; 403/114; 403/115
[58] Field of Search ............... 356/141, 152, 138, 372, 356/399, 400; 33/279, 280, 281, 285, 286, 287, 299; 350/319, 540, 543, 544; 403/114–116, 123, 141

[56] References Cited

U.S. PATENT DOCUMENTS

| | | | |
|---|---|---|---|
| 1,294,583 | 2/1919 | Whisler et al. | 403/114 X |
| 2,010,587 | 8/1935 | Fisher et al. | 403/114 X |
| 2,687,024 | 8/1954 | George | 403/123 X |
| 3,210,103 | 10/1965 | Montgomery et al. | 403/115 |
| 3,484,136 | 12/1969 | Colson | 33/286 X |
| 3,703,682 | 11/1972 | Wickman et al. | 356/138 X |
| 3,850,047 | 11/1974 | Davis | 403/116 X |
| 4,557,335 | 12/1985 | Handy | 403/115 X |
| 4,666,300 | 5/1987 | Zollman et al. | 356/141 |
| 4,762,411 | 8/1988 | Pitalo et al. | 356/152 |
| 4,798,461 | 1/1989 | Pavlin et al. | 356/152 X |

FOREIGN PATENT DOCUMENTS

| | | | |
|---|---|---|---|
| 56-104209 | 8/1981 | Japan . | |
| 57-63415 | 4/1982 | Japan . | |
| 57-96213 | 6/1982 | Japan . | |
| 0187214 | 10/1984 | Japan | 33/286 |
| 60-243508 | 12/1985 | Japan . | |
| 2143396 | 2/1985 | United Kingdom . | |

Primary Examiner—Stephen C. Buczinski
Assistant Examiner—Linda J. Wallace
Attorney, Agent, or Firm—Wenderoth, Lind & Ponack

[57] ABSTRACT

An surveying apparatus for a route survey including a laser oscillator incorporated in a subjective cylinder and adapted to direct a laser beam onto a target disposed in an objective cylinder to form a laser spot on the target so as to enable the curvature of a route to be measured by analyzing deviation of the laser spot on the target. The subjective and objective cylinders are connected by a joint means disposed in the middle between the laser oscillator and the target, thereby to improve measuring accuracy and durability.

6 Claims, 3 Drawing Sheets

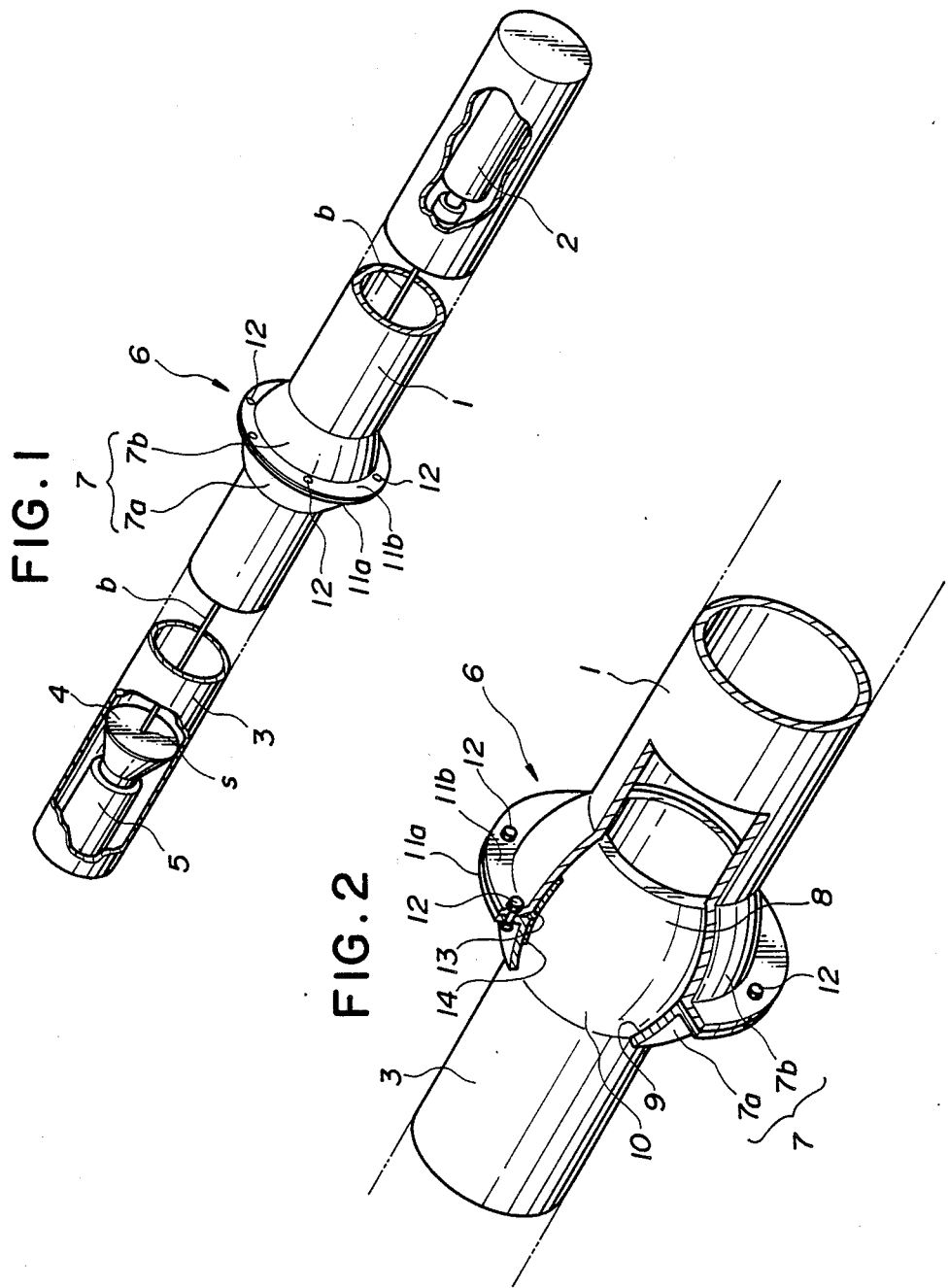

SURVEYING APPARATUS

BACKGROUND OF THE INVENTION (1) Field of the Invention

This invention relates to a surveying apparatus capable of making a route survey in road building, tunneling work and so on with remarkable accuracy, and particularly to a surveying apparatus in which a laser spot formed by irradiating a laser beam on a target is analyzed as to its coordinate deviation to determine the curvature of a route or the like.

(2) Description of the Related Art

Traverse surveying which has been conventionally adopted in road building, tunneling work and so on has been significantly improved with respect to measuring accuracy and feasibility due to electronics. Among conventional electronic surveying methods, a laser surveying method has advantageously been applied to actual fieldwork in constructing a road, a tunnel and so on. In this laser surveying method, a coherent laser beam irradiated from a laser oscillator impinges a target spaced from the laser oscillator to form a laser spot on the target and a positional deviation of the laser spot on the target is arithmetically calculated by a computer so as to measure the curvature and/or orientation of a route to be surveyed, whereby a route survey can be carried out with considerable accuracy. Examples of conventional surveying apparatuses of this type are described in British Pat. No. 2,143,396(B) and Japanese Patent Application Public Disclosures SHO 56(1981)-104209(A), SHO 57(1982)-63415(A), and SHO 57(1982)-96213(A).

These prior art apparatuses adopt a structure in which the laser oscillator and the target are separated from each other. With such a structure, therefore, it is difficult to determine the orientation and position of the taget relative to the origin position at which the laser oscillator is located.

The inventor of the present invention formerly proposed a surveying apparatus in Japanese Patent Application Public Disclosure SHO 60(1985)-243508(A), in order to eliminate the aforementioned drawback suffered by the conventional surveying apparatus in which the laser oscillator and the target are separated.

The proposed surveying apparatus has a structure in which a main cylinder incorporating a laser oscillator is bendably connected with a guide cylinder incorporating a target on which a laser beam from the laser oscillator impinges to form a laser spot. This proposed apparatus is easy to handle and uses a simple arithmetic operation for analyzing the coordinates of the laser spot on the target, because the distance between the laser oscillator and the target is fixed.

In the proposed apparatus, however, a joint for bendably connecting the main cylinder incorporating the laser oscillator with the guide cylinder incorporating the target is formed by a sealing member comprising elastic material such as rubber. Therefore, the range within which the guide cylinder is allowed to bend is narrow so that a route having large curvature cannot be surveyed. Besides, the elastic material undergoes a secular change, and therefore, the joint is of poor lasting quality and there is a possibility of the distance between the laser oscillator and the target varying elastically.

Furthermore, it can by no means be said that it is desirable to locate the joint for bendably connecting the main and guide cylinders with each other in the vicinity of the laser oscillator as done in the aforementioned surveying apparatus formerly proposed by the inventor of the present invention. That is to say, because the measuring accuracy of the surveying apparatus of this type depends on not only the resolving power of an image pickup means for detecting a laser spot formed on the target but also on the amount of the positional deviation of the laser spot on the target, it seems that the measuring accuracy can be improved by disposing the joint between the main and guide cylinders in the vicinity of the laser oscillator so as to enlarge the positional deviation of the laser spot. However, the structure in which the joint is disposed near the laser oscillator can in no way bring about a relatively large deviation of the laser spot from the center of the target.

SUMMARY OF THE INVENTION

This invention was made to overcome the problems of the prior art described above and aims to provide a surveying apparatus for a route survey, in which a subjective cylinder incorporating a laser oscillator and an objective cylinder incorporating a target are bendably connected with each other so as to enable the objective cylinder to be smoothly bent over a wide range of bending angles relative to the subjective cylinder and warrant high measuring accuracy and excellent durability.

To accomplish the object described above according to the present invention, there is provided a surveying apparatus which comprises:

a subjective cylinder incorporating a laser oscillator for irradiating a laser beam;

an objective cylinder incorporating a target on which the laser beam from the laser oscillator impinges to from a laser spot, and an image pickup means for detecting the coordinates of the laser spot on the target; and a joint means for bendably connecting the subjective and objective cylinders substantially midway between the laser oscillator and the target.

The joint means through which the subjective and objective cylinders are connected consists of spherical surfaces which are in surface contact with each other.

The subjective and objective cylinders are located on a route to be surveyed and the laser oscillator is operated to irradiate a laser beam onto the target so as to form a laser spot. By analyzing the coordinates of the laser spot on the target with a computer, the curvature of the route can be measured with a high degree of accuracy.

Because the subjective and objective cylinders are bendably connected by the joint means comprising the spherical surfaces, the distance between the laser oscillator and the target can in no way vary. As a result, measuring accuracy can be maintained over a long time.

BRIEF DESCRIPTION OF THE DRAWINGS

Other objects and characteristics of the present invention will become apparent from the following description of a preferred embodiment with reference to the accompanying drawings.

FIG. 1 is a perspective view, partly in section, illustrating a preferred embodiment of a surveying apparatus according to this invention.

FIG. 2 is an enlarged view, partly in section, illustrating a portion of the same.

DETAILED DESCRIPTION OF THE PREFERRED EMBODIMENTS

Figure 3:
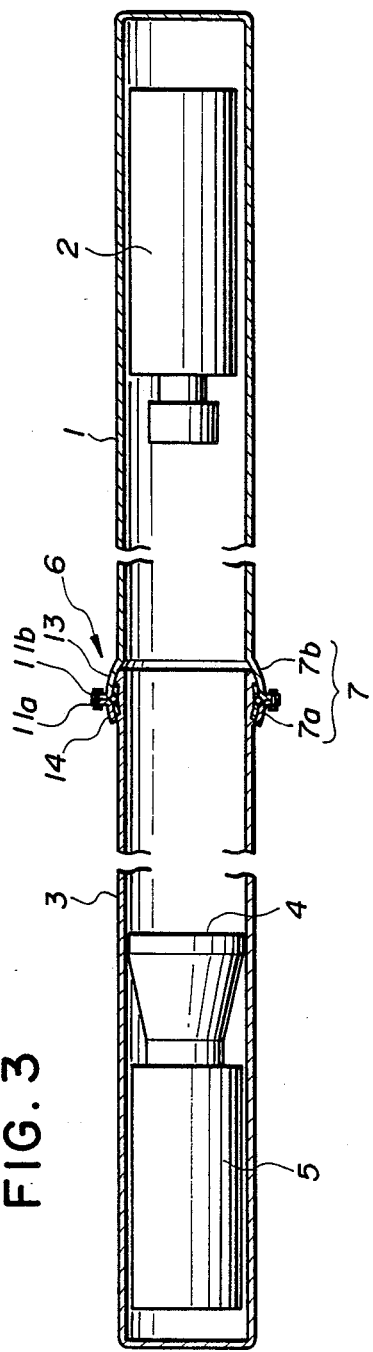
FIG. 3 is a side view, partly in section, illustrating the same.

One example of the surveying apparatus according to the present invention will be described with reference to FIGS. 1 through 3.

In the drawings, reference numeral 1 denotes a subjective cylinder incorporating a laser oscillator 2 which irradiates a laser beam b in the axial direction. Denoted by 3 is an objective cylinder which incorporates a target 4 on which the laser beam b impinges to form a laser spot s and an image pickup means 5 for reading the laser spot s formed on the target 4 to output a positional signal representing the coordinates of the laser spot on the target.

Image pickup means applicable to this invention include an electronic image pickup tube such as an image orthicon or a solid image pickup means such as a CCD. In the electronic image pickup tube, the face plate (optoelectronic negative electrode plate) serves as the target 4, and therefore, the image pickup means 5 is integrated with the target 4.

In the solid image pickup means such as a CCD, a semitransparent screen is used as the target 4 and an optical system such as a lens is arranged behind the target so as to focus the laser spot on the solid image pickup means. Alternatively, a focusing lens may be used as the target 4 so as to allow the laser beam from the laser oscillator to directly impinge the solid image pickup means.

Reference numeral 6 designates a joint means for bendably connecting the subjective cylinder 1 and the objective cylinder 3 with each other. The joint means 6 comprises a subjective yoke member 7 disposed on one end at the beam outgoing side of the subjective cylinder 1 and an objective yoke member 8 disposed on one end at the beam incident side of the objective cylinder 3. Because the objective yoke member 8 is held inside the subjective yoke member 7 in this embodiment, the subjective yoke member 7 is provided with a spherical inner surface 9 and the objective yoke member 8 is provide with a spherical outer surface 10. The spherical surfaces 9 and 10 of the subjective and objective yoke members 7 and 8 have the substantially same curvature and come into surface contact with each other in a coaxial state. That is to say, the joint means has the structure of a so-called universal joint, in which the subjective cylinder 1 functions as a driving shaft and the objective cylinder 3 functions as a follower. Therefore, the objective cylinder 3 can be freely bent relative to the subjective cylinder.

A structure in which the subjective yoke member 7 is disposed inside the objective yoke member 8 may of course be adopted.

In this embodiment, the subjective yoke member 7 is divided into a front half 7a and a rear half 7b in order to facilitate the assembly of the objective yoke member 8 having the spherical outer surface within the subjective yoke member 7 having the spherical inner surface. Thus, though the subjective yoke member 7 is divided into two halves from the standpoint of design, such structure of the subjective yoke member is by no means necessary to this invention.

The front half 7a and rear half 7b constituting the subject yoke member 7 have flanges 11a, 11b which contact each other and are secured by means of retaining means 12 comprising, for example, bolts and nuts.

Furthermore, the subjective yoke member 7 is provided on the inner surface thereof with stem members 13. Strictly speaking, the stem members 13 are positioned intermediate the halves, at the spherical inner surface 9, of the subjective yoke member 7. In this embodiment, the stem member 13 is a steel ball partly held in position between the front and rear halves 7a, 7b of the subjective yoke member 7. On the other hand, the objective yoke member 8 defines in the outer surface 10 thereof, guide grooves 14 so as to slidably receive the stem members 13 on the inner surface 9 of the subjective yoke member 7. The guide grooves 14 in the objective yoke member extend in the axial direction of the objective cylinder 3. The length of the guide groove 14 corresponds to the region within which the objective cylinder 3 is allowed to be angularly bent relative to the subjective cylinder 1. By use of an axially supporting means comprising the stem members 13 and the guide grooves 14, the objective cylinder 3 is allowed to be bent about the joint means 6 relative to the subjective cylinder 1, but is not allowed to rotate about the axis thereof. In this embodiment, the stem members 13 are provided on the subjective yoke member 7 and the guide grooves 14 are formed in the objective yoke member 8. But, alternatively, there may of course be adopted a structure in which the stem members 13 is provided on the outer surface of the objective yoke member 8 and the guide grooves 14 are formed in the inner surface of the subjective yoke member 7. Moreover, only one part of the stem member 13 and the guide groove 14 may be adopted in the joint means 6.

According to the joint structure noted above, the objective cylinder 3 is allowed only to be rockingly bent about the joint means 6 relative to the subjective cylinder 1 without rotating about the axis thereof.

Figure 4:
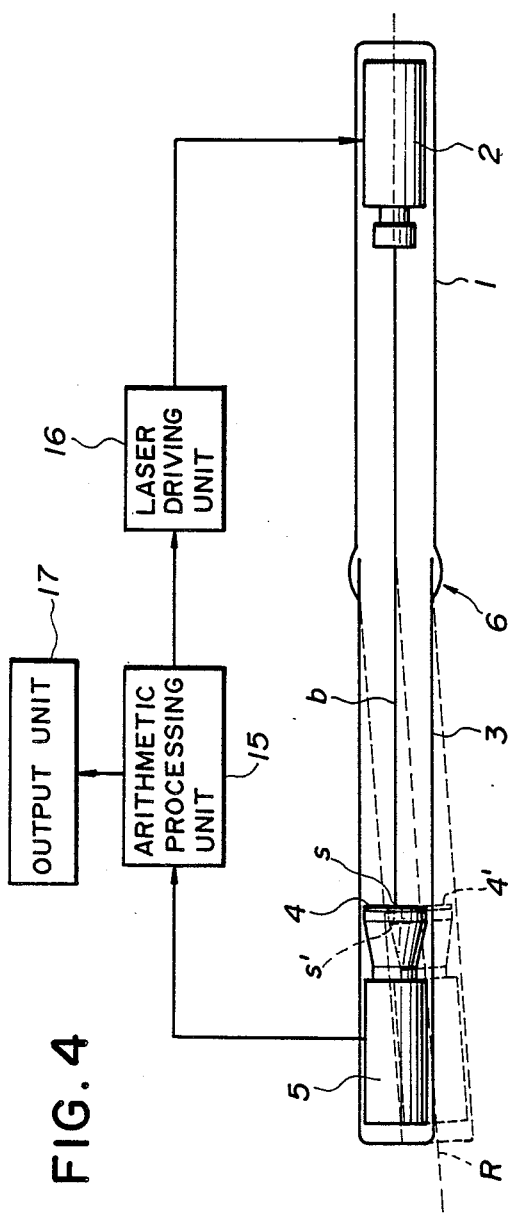
FIG. 4 is a schematic diagram illustrating the operating principle of the apparatus according to this invention.

Therefore, when a non-linear route R is surveyed, as illustrated in FIG. 4, after the subjective cylinder 1 is positioned on the route R and is pointed in the direction of a reference line, the objective cylinder 3 is angularly bent relative to the subjective cylinder 1 and located along the route R so that the center of the target 4 is coincident with one point of the route. When the laser oscillator 2 incorporated in the subjective cylinder 1 is operated to irradiate the laser beam b onto the target 4, a laser spot s' is formed at a position deviating from the coordinate center of the target 4 by a distance proportional to the angle at which the objective cylinder 3 is bent relative to the subjective cylinder 1. The position of the laser spot on the target is detected by the image pickup means 5 and analyzed with a computer, to thereby measure the curvature or turning angle of the route to be surveyed.

As will be understood from the description above, the accuracy of the measurement of a given curvature of the route is increased with an increase in the deviation of the laser spot from the center of the target by tilting the target relative to the optical axis (laser beam b). That is to say, the degree of deviation of the laser spot on the target 4 is increased with an increase in the tilting angle of the target, with the result that even a route having a very small degree of curvature to be surveyed can be measured accurately. This means that the larger the bending angle of the subjective and objective cylinders is, the larger the degree of deviation of the laser spot on the target is. In other words, the shorter the objective cylinder 3 is relative to the subjective cylinder 1 or vice versa, the larger the bending angle at which the subjective and objective cylinders are joined. This will be described in detail hereinafter with reference to FIG. 5(A) and FIG. 5(B).

Figure 5A:
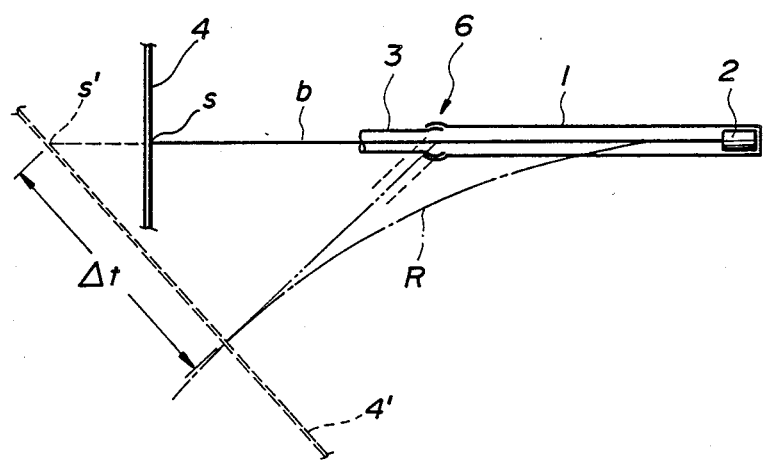
FIGS. 5(A) and 5(B) are explanatory diagrams illustrating measuring effects of this invention and a comparative structure.

In FIG. 5(A), there is schematically illustrated the surveying apparatus comprising the subjective cylinder 1 and the objective cylinder 3 which have substantially the same length. When the subjective and objective cylinders are arranged in a straight line, the laser spot s is located in the center of the target 4. When the objective cylinder 3 is positioned along the non-linear route R having a certain curvature by tilting the target 4 to the position 4', the laser spot s' on the target 4' deviates a distance $\Delta t$ from the center of the target.

Figure 5B:
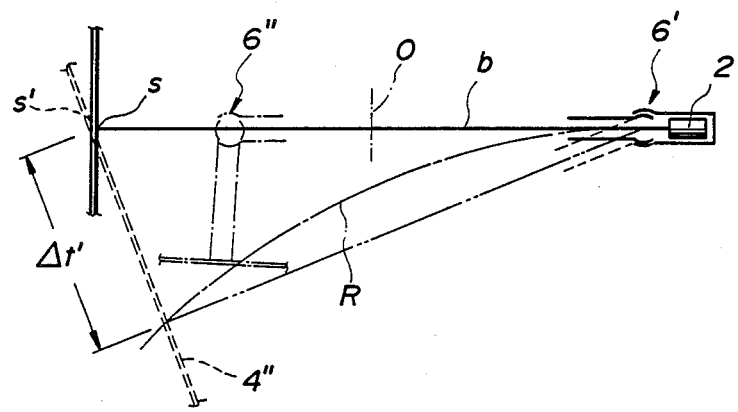

When a joint 6' is close to the laser oscillator 2, namely, the objective cylinder is longer than the subjective cylinder as illustrated in FIG. 5(B), the tilting angle of the target 4" on the route R is relatively small, with the result that the amount of the deviation $\Delta t'$ of the laser spot from the center of the target is smaller than $\Delta t$ in the structure of FIG. 5(A). Therefore, the resolving power and measuring accuracy of the apparatus shown in FIG. 5(B) is inferior to that in FIG. 5(A).

When the joint (indicated by an imaginary line 6" in FIG. 5(B)) is disposed ahead of the middle point O of the optical axis, namely, the objective cylinder having the target is shorter than the subjective cylinder incorporating the laser oscillator, the laser beam b impinges the target at an acute angle, with the result that the laser spot on the target is blurred so as not to assume a pin point or that the target cannot be positioned on a route having relatively large curvature.

From the reason noted above, in the present invention, the joint means 6 for bendably connecting the subjective and objective cylinders with each other is located substantially midway between the laser oscillator 2 disposed in the subjective cylinder and the target 4 in the objective cylinder.

The surveying apparatus of the present invention includes a control system such as a computer, which has a function of driving the laser oscillator 2 and subjecting the positional information of the laser spot s detected by the image pickup means 5 to arithmetic analysis. That is to say, the control system comprises an arithmetic processing unit 15, a laser driving unit 16, and an output unit 17, as schematically illustrated in FIG. 4. The arithmetic processing unit 15 serves to calculate the deviation of the laser spot s on the target and determine the curvature and so on of the route to be surveyed upon the reception of the coordinate data of the laser spot which are delivered from the image pickup means 5. The laser driving unit 16 is adapted to operate the laser oscillator 2 to irradiate the laser beam synchronously with the aforementioned arithmetic processing unit 15. The output unit 17 generally comprises a display device such as a CRT for displaying in real time the results of analysis obtained by the arithmetic processing unit 15, a printer for outputting the results of analysis, external memory means for storing the measuring data and the results of the analysis, etc.

When the surveying apparatus having the structure described above according to the present invention is applied to a route survey, it is necessary to fix the subjective cylinder 1 and the objective cylinder 3 onto adequate holding means movable along the route to be surveyed. For example, the cylinders may be mounted respectively on trucks movable on rails laid along the route to be surveyed. By advancing along the rails the trucks on which the cylinders are mounted while subjecting positional data of the trucks and coordinate data of the laser spot on the target to an arithmetic analysis, the curvature of the route to be surveyed can be readily measured in real time and successively stored in the external memory so as to enable the results of the survey to be displayed later on the display unit.

When tunneling work to which a traverse survey cannot be applied is carried out, one of the subjective and objective cylinders may be mounted on an excavator and the other cylinder may be adjusted onto a reference ground point, whereby suitability of the route can be judged correctly.

As is plain from the foregoing description, according to the present invention, the objective cylinder incorporating the target and the image pickup means can be rockingly moved smoothly and reliably over a wide range relative to the subjective cylinder incorporating the laser oscillator, because the subjective and objective cylinders are bendably connected with each other by means of the joint means comprising the spherical surfaces which are in surface contact with each other. Therefore, the subjective and objective cylinders can be readily moved following the route with accuracy. Besides, the joint means is not fabricated elastic and can in no way be deformed and thus, stably maintains a higher degree of accuracy over a long time. Thus, this surveying apparatus exhibits excellent durability. Furthermore, since the joint means is disposed in substantially midway between the laser oscillator and the target, a relatively large deviation of the laser spot on the target can be detected even if the curvature of the route to be surveyed is small, and thus, the measuring accuracy is comparatively high. By use of the control system comprising a computer, an arithmetic operation for analyzing the data representing the coordinates and deviation of the laser spot on the target can be executed at a high speed and accurately and an automatic survey in real time can be accomplished with ease. Thus, the surveying apparatus according to this invention has a simple structure and great practical utility.

I claim:

1. A surveying apparatus comprising:

a subjective cylinder;

an objective cylinder connected to said subjective cylinder;

joint means connecting said subjective and said objective cylinders so as to be bendable relative to one another about said joint means; and measuring means for determining the angle at which said cylinders are bent relative to one another about said joint means, said measuring means including a laser oscillator means incorporated in said subjective cylinder for irradiating a laser beam in a predetermined direction, a target incorporated within said objective cylinder and positioned relative said laser oscillator means so as to be impingeable by laser beams irradiated by said laser oscillator means, image pickup means operatively associated with said target for detecting the location on the target at which a laser beam irradiated by said laser oscillator means impinges said target and for outputting a signal indicative of said location, and a control system operatively connected to said image pickup means for determining said angle by comparing said location to a reference position on said target, said joint means being disposed substantially midway between said laser oscillator means and said target.

2. A surveying apparatus as claimed in claim 1, wherein said joint means comprises a pair of spherical surfaces in contact with and slidable over one another and each of which surfaces is integral with a respective one of said cylinders, a subjective yoke member integral with said subjective cylinder and defining one of said spherical surfaces, and an objective yoke member integral with said objective cylinder and defining the other of said spherical surfaces, said subjecting yoke member disposed within said objective yoke member.

3. A surveying apparatus as claimed in claim 1, wherein said joint means comprises a pair of spherical surfaces in contact with and slidable over one another and each of which surfaces is integral with a respective one of said cylinders, one of said spherical surfaces having at least one groove extending therein in a direction parallel to the central longitudinal axis of the one of said cylinders with which said one of said spherical surfaces is integral, and further comprising a respective slide member disposed on the other of said spherical surfaces and extending within each said at least one groove.

4. A surveying apparatus as claimed in claim 3, wherein said joint means comprises a subjective yoke member integral with said subjective cylinder and defining said one of said spherical surfaces, and an objective yoke member integral with said objective cylinder and defining said other of said spherical surfaces, said subjective yoke member disposed within said objective yoke member.

5. A surveying apparatus as claimed in claim 4, wherein said subjective yoke member comprises a front half portion, and a rear half portion connected to said front half portion, and each said slide member is located and maintained in position between said front half portion and said rear half portion.

6. A surveying apparatus as claimed in any one of claims 1 and 3-5, wherein said control system includes an arithmetic processing unit for calculating coordinates of said location, a laser drive unit for operating said laser oscillator means, and an output unit having a display device for displaying data generated by said control system.

* * * * *